Feb. 8, 1966 J. F. STEPHENS ET AL 3,233,990
METHOD AND APPARATUS FOR FORMING FIBERS BY SPINNING
FLUID BLAST AND ROTOR
Filed Sept. 24, 1962 3 Sheets-Sheet 1
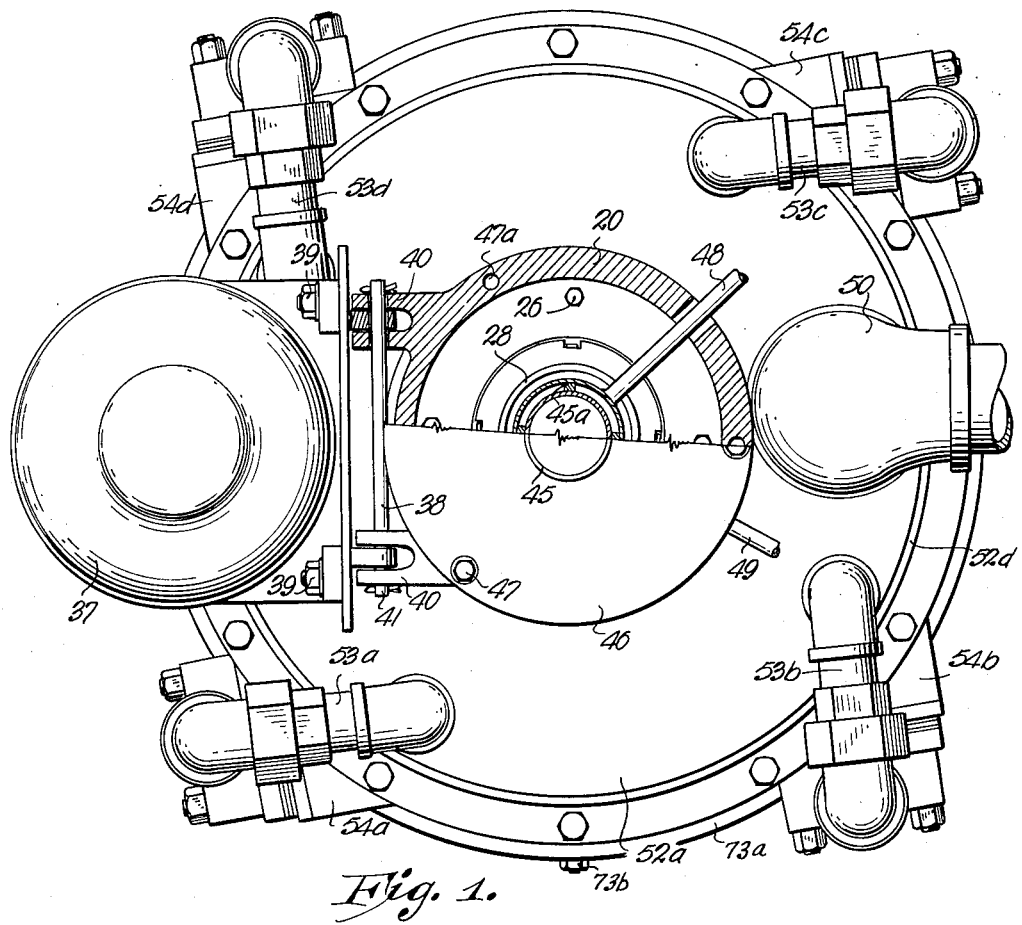
Fig. 1.
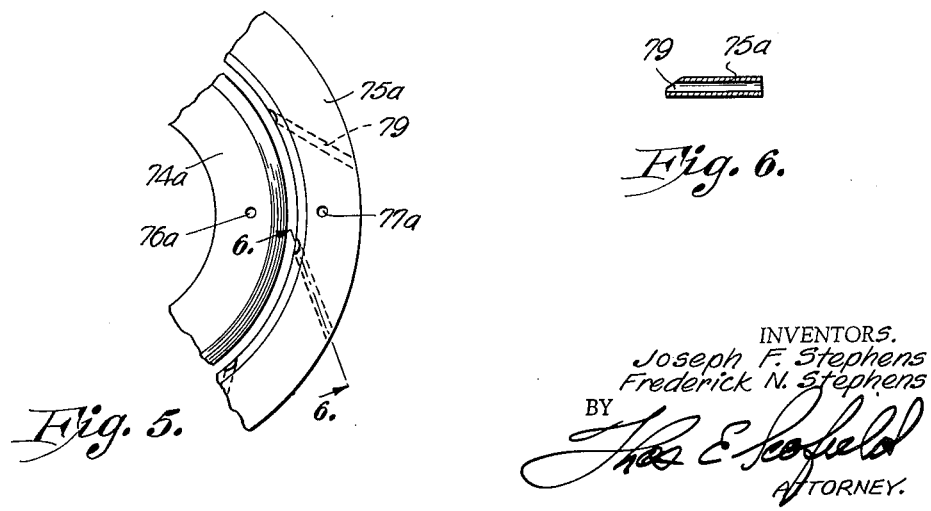
Fig. 5.
Fig. 6.
INVENTORS.
Joseph F. Stephens
Frederick N. Stephens
BY
ATTORNEY.

INVENTORS.
Joseph F. Stephens
Frederick N. Stephens
BY
ATTORNEY.

INVENTORS.
Joseph F. Stephens
Frederick N. Stephens
BY
ATTORNEY.

United States Patent Office 3,233,990
Patented Feb. 8, 1966

3,233,990
METHOD AND APPARATUS FOR FORMING FIBERS BY SPINNING FLUID BLAST AND ROTOR
Joseph F. Stephens, Kansas City, Mo., and Frederick N. Stephens, Shawnee Mission, Kans., assignors to Gustin-Bacon Manufacturing Company, a corporation of Delaware
Filed Sept. 24, 1962, Ser. No. 226,774
8 Claims. (Cl. 65—6)

This application is a continuation-in-part of our application Serial No. 810,283, filed May 1, 1959, entitled, "Method and Apparatus for Production of Fine Glass Fibers," now abandoned.

This invention relates to methods of and apparatus for producing fine glass fibers and refers more particularly to such methods and apparatus wherein a continuous feed stream of molten glass is divided into a plurality of small diameter flows distributed from the periphery of a high speed rotating device into the path of a high temperature gas blast to achieve attenuation of the glass flows and commercially produce at a high rate glass fibers of a diameter from one of five microns.

Previously, certain methods and apparatus have been provided by the art in an effort to continuously and commercially produce fine diameter glass fibers by the centrifugal projection of molten glass streams into a high velocity, high temperature attenuating gas blast. A number of critical problems, however, have been raised by the development of such processes which have not been solved by the art. Very extreme environmental conditions exist in such processes, wherein, for example, 1900° F. molten glass is fed into a body rotating at a rate of from three to four thousand revolutions per minute with a burning gas blast passing immediately peripherally of the rotating body of a temperature of approximately 3000° F.

The limited strength and endurance of materials available to fabricate apparatus for practicing such processes make it necessary to rigorously shield and protect key portions of the apparatus from excessive heat whereby to permit continuous operation and substantially long life. Means additionally must be provided to protect the rotating body against unbalance caused by change or movement of the glass feed stream thereto. Means must be provided to permit regulation of the gas blast motion and position relative the rotating body to obtain optimum attenuation of the fibers. It would be desirable also to be able to control the character of the gas blast flame to better control the fiber attenuation.

Therefore, an object of the invention is to provide methods of and apparatus for the production of fine glass fibers which are capable of continuous operation and wherein the apparatus has a sufficiently long operating life to permit commercial production of fine glass fibers which are capable of continuous operation and wherein the apparatus has a sufficiently long operating life to permit commercial production of fine glass fibers at high rate.

Another object of the invention is to provide methods of and apparatus for the production of fine glass fibers wherein molten glass is fed in a continuous stream to a rotating fiber-forming device moving at a very high rotational velocity, the fiber-forming device so formed that even substantial wavering and/or discontinuities of the feed stream of glass are compensated for and do not imbalance the device or interfere with the fiber-forming operation and apparatus.

Another object of the invention is to provide methods of and apparatus for production of fine glass fibers wherein a perforated rotor is spun at high rotational velocity to distribute fine filaments of glass therefrom, a molten stream of glass passing centrally of the means applying rotational force to the rotor and a continuous blast of high temperature gas being directed immediately peripherally of the rotor, both the glass and gas flows acting to apply weakening heat stress to the means driving the rotor, means being provided to so minimize such heat stress as to permit substantially continuous operation and long life of the apparatus.

Another object of the invention is to provide methods of and apparatus for production of fine glass fibers wherein the location of the gas blast relative the fiber-forming area peripheral to the fiber-forming device is adjustable to obtain optimum fiber attenuation.

Yet another object of the invention is to provide methods of and apparatus for production of fine glass fibers wherein the gas blast peripheral to the fiber-forming device may be regulated to always provide an oxidizing flame whereby to insure maximum fiber attenuation, if desired.

Another object of the invention is to provide methods of and apparatus for production of fine glass fibers wherein a continuous homogeneous gas blast is provided in a ring peripheral to a fiber-forming rotor, the blast itself rotating at high velocity relative its emission area without resort to directing means or jets whereby to permit such control of the blast and effect on the fibers as to obtain optimum and uniform fiber attenuation.

Still another object of the invention is to provide apparatus for production of fine glass fibers including a perforated rotor, means for spinning said rotor at a very high velocity, means for transferring a molten stream of glass through the rotor in a uniform flow and means for providing a rotating continuous gas blast closely peripheral to the rotor, said apparatus being of minimum complexity, having its critical parts readily accessible for replacement and/or repair, said apparatus of relative ease of manufacture and relative minimum expense, yet having long life and great endurance under the extreme environmental conditions of operation and operable to produce fine glass fibers of commercial quality at a high rate.

Other and further objects of the invention will appear in the course of the following description thereof.

In the drawings, which form a part of the instant specification and are to be read in conjunction therewith, an embodiment of the invention is shown and, in the various views, like numerals are employed to indicate like parts.

FIG. 1 is a top view of an apparatus embodying the invention with parts cut away and in section to better illustrate the inventive structure.

FIG. 5 is a fragmentary plan view of a modification of the replaceable orifice rings defining the firing chamber orifice with openings shown extending through the outer ring to permit entrainment of air with the gases passing through the orifice.

FIG. 6 is a view taken along the line 6—6 of FIG. 5 in the direction of the arrows.

Figure 2:
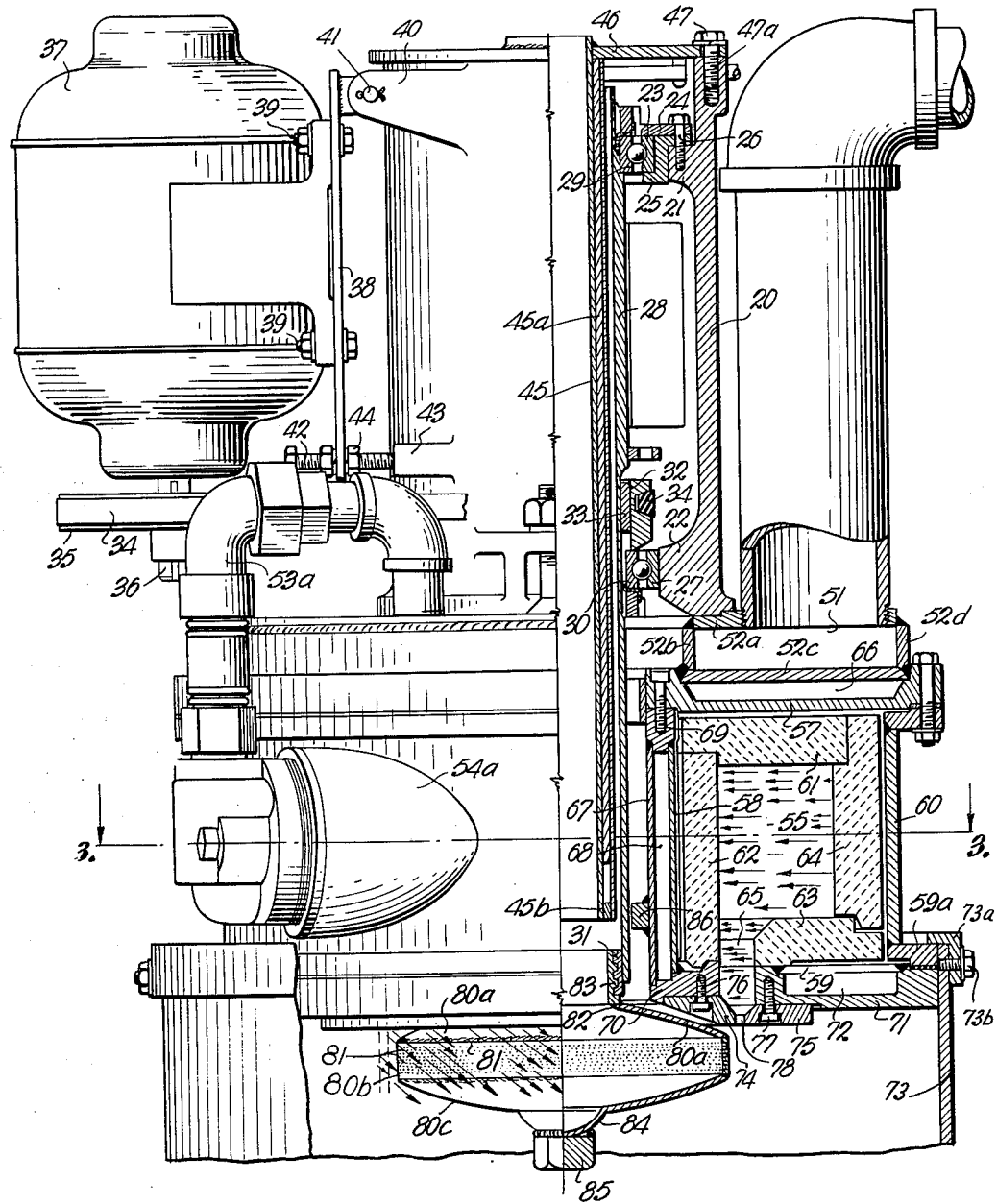
FIG. 2 is a side partly sectional view with parts cut away to better illustrate the inventive structure of the apparatus embodying the invention of FIG. 1.
Figure 3:
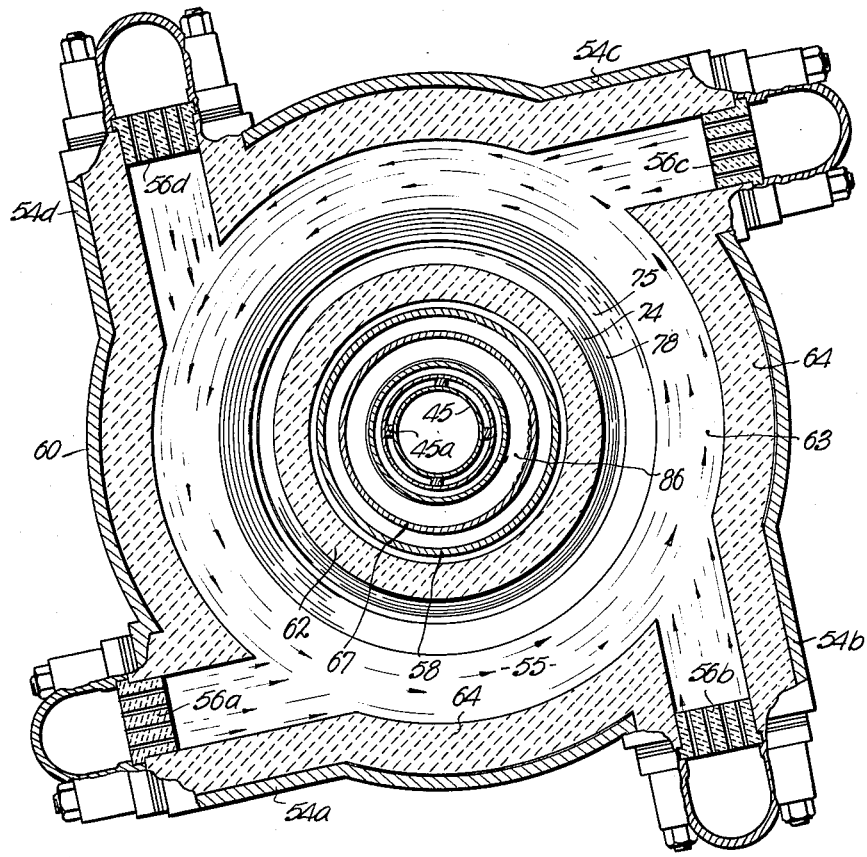
FIG. 3 is a simplified view taken along the line 3—3 of FIG. 2 in the direction of the arrows with some parts omitted for clarity.

Referring to the drawings, and more particularly to FIGS. 1, 2 and 3, at 20 is shown a cylindrical support casting having inwardly extending upper and lower ring portions 21 and 22. The outer race 23 of a wall bearing is rigidly fixed relative ring 21 by jaw members 24 and 25 fixed to ring 21 by bolts 26. The outer race 27 of a second ball bearing is welded or otherwise fixedly attached to the inner face of ring 22. Cylindrical torque tube 28 has fixed to the outer surface thereof the inner races 29 and 30 of the ball bearings to match outer races 23 and 27, respectively. Torque tube 28 extends substantially below ring 22 of casting 20 and has an internally threaded member 31 fixed interiorly of its lower end.

Means for driving the torque tube in high speed rotation relative the support casting on the bearings previously described are mounted on the casting 20 and connect to the torque tube. Belt ring 32, having circumferential groove 33 formed therein to receive conventional friction belt 34, is welded or otherwise fixedly attached to the outer surface of torque tube 28 intermediate of races 29 and 30. The other end of belt 34 fits over pulley 35 which is fixedly attached to shaft 36. Shaft 36 is driven in high speed rotation by conventional electric motor 37 or other prime mover fixedly attached to plate 38 by bolts 39. Plate 38 is pivotally mounted on ears 40 on casting 20 by pin 41. Adjustable bolts 42 thread through openings (not shown) in plate 38 and abut platforms 43 on casting 20. Lock nuts 44 serve to maintain bolts 42 in their desired extension relative plate 38 and platform 43 whereby to regulate the tension on belt 34.

Means are provided to shield the inner surface of torque tube 28 from excessive heat. This means comprises concentrically double-walled water tube 45 mounted within torque tube 28, cylindrical in form and uniformly spaced from the inner surface of torque tube 28. Means for mounting tube 45 in torque tube 28 comprise mounting plate 46 fixedly attached to casting 20 by bolts 47 engaging openings 47a in the upper end of the casting. Dividers 45a space the inner and outer concentric walls of tube 45 from one another to permit heat exchanging liquids such as water or other suitable medium to pass therebetween. Input flow line 49 and output flow line 48 (FIG. 1) pass heat exchanging liquid to and from the annulus between the inner and outer walls of tube 45. Tube 45 preferably extends within torque tube 28 substantially the entire length thereof closely adjacent to internally threaded member 31. The upper and lower ends of tube 45 are closed by plate 46 and ring 45b, respectively.

Means for providing a burning gas blast are mounted on casting 20. Gas inlet flow line 50 leads into ring manifold 51 circumferentially positioned relative to torque tube 28. The enclosing walls 52a, 52b, 52c and 52d of manifold 51 are rigidly fixed to one another and the lower portion of casting 20. A plurality of gas flow lines 53a, 53b, 53c and 53d lead from openings in the upper wall 52a of manifold 51 outwardly, downwardly and into tangential inlet ports 54a–54d, inclusive. Tangential inlet ports 54a–54d, inclusive, lead into ring combustion chamber 55 through perforated fire screens 56a, 56b, 56c and 56d (FIG. 3). The combustion chamber 55 runs circumferentially to and spaced outwardly from the torque tube 28. Chamber 55 has upper wall 57, inner wall 58, lower wall 59 and outer wall 60. Upper, inner, lower and outer rings of refractory material 61, 62, 63 and 64, respectively, are provided, the latter having openings therethrough for ports 54a–54d, inclusive. The flow of gas in through the tangential inlet ports is preferably substantially tangential to the inner ring of refractory material whereby the blasts of combustion gases flowing in the ports will move in a circular direction in the combustion chamber 55 as indicated by the broken lines in FIGURE 3. A continuous ring gap 65 is provided between the inner and lower refractory rings 62 and 63 whereby to provide a continuous circumferential outlet orifice for the combustion gases. The resulting flow is indicated in broken lines in FIGURE 2.

The lower wall 52c of the manifold 51 and the upper wall 57 of the combustion chamber provide therebetween a ring-shaped space or volume 66 adapted to receive heat exchanging medium such as water. Vertically positioned cylindrical wall 67 is provided interiorly of inner wall 58 of combustion chamber 55 to provide another annular ring space 68 adapted to receive heat exchanging medium. Suitable ring members 69 and 70 seal the upper and lower limits of the space 68 and are attached to walls 67 and 58 by welding or other conventional means. Lower, horizontally disposed ring wall 71 having ring cavity 72 formed therein provides, with lower wall 59 of the combustion chamber 55, yet a third volume for the receipt of heat exchanging medium such as water. The connections to the heat exchanging medium receiving spaces 66, 68 and 72 are not shown for the sake of simplicity but are of the same character as input and output flow lines 48 and 49. The entire combustion chamber assembly, including the walls surrounding heat exchanging medium spaces, refractories, combustion chamber walls, etc., are rigidly fixed to one another and the lower wall 52c of manifold 51 and thus rigidly connected to the casting 20.

A depending cylindrical flange or shield 73 extends downwardly from the lower end of the combustion chamber circumferentially thereto and is fixed to ring flange 59a and wall 71 forming the lower outside edge thereof by a ring clip 73a with bolts 73b engaging both the clip 73a and the flange 73 to tightly fix them against the lower outside edge of the combustion chamber assembly.

Inner and outer orifice rings 74 and 75 are fixed by bolts 76 and 77 to rings 70 and 71, respectively. Orifice rings 74 and 75 are removable to permit adjustment of the width of the annular gap 78 therebetween or its position relative the torque tube 28 by substituting different rings of different forms.

FIGS. 5 and 6 show a modification of the orifice rings wherein the inner ring 74a is positioned next to the outer ring 75a with openings 79 extending through the outer ring 75a between the bolt holes receiving bolts 77a in the direction of rotation of the fiber-forming rotor.

Figure 4:
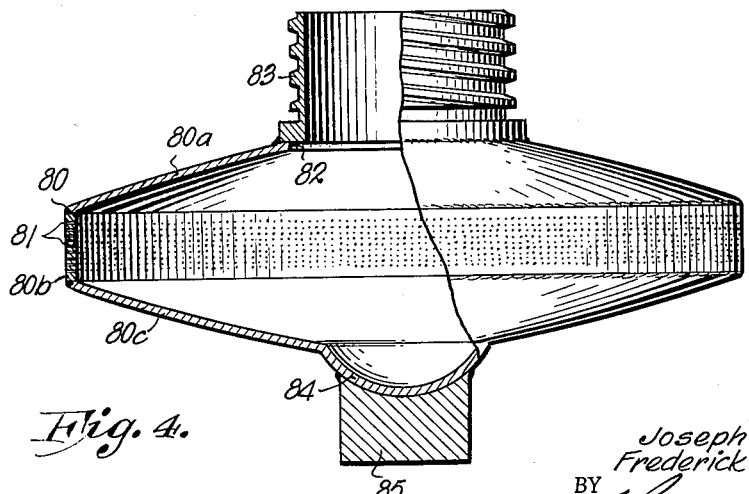
FIG. 4 is a side, partly cut away sectional view of the inventive fiber-producing rotor employed in the inventive apparatus and method.

A rotor (shown in greater detail in FIG. 4) is removably threaded in the member 31 fixed within the lower end of torque tube 28. Referring to FIGS. 2 and 4, the rotor may be generally designated as 80 and has a top wall 80a, a side wall 80b and a bottom wall 80c. Side wall 80b is oriented substantially parallel to the axis of tube 28 and comprises a ring of suitable metal able to withstand the temperature of molten glass and the adjacent gas blast and has a plurality of openings or perforations 81 extending therethrough. Perforations 81 are preferably arranged in parallel rows extending circumferentially around the wall 80b. Upper wall 80a is dished upwardly from its connection with wall 80b centrally thereof and has opening 82 also centrally thereof. Externally threaded cylindrical member 83 is welded or otherwise fixedly attached to the top wall 80a so the opening 82 is continuous with the inside of member 83. Bottom wall 80c is dished centrally from its connection with side wall 80b and has cup-shaped depression 84 centrally thereof below opening 82. Depression 84 is circular in plan view and in any vertical cross section forms an arc of a circle. The diameter of the depression 84 at the top thereof is preferably at least substantially the inside diameter of water tube 45. A nut 85, hexagonal in shape to aid in attaching the rotor to torque tube 28, is fixedly attached to the under side of the wall of depression 84. With rotor 80 threaded to member 31, flange 73 preferably extends substantially below the lower end of the rotor and nut 85.

The side wall 80b of rotor 80 is preferably a ring such as that disclosed in the application of Joseph T. Warkoczewski, filed March 14, 1958, Serial No. 721,491, "Method and Apparatus for Forming Finely Perforated Rings," now Patent No. 3,040,398 issued June 26, 1962, and may be fabricated by such a method as is disclosed in said patent. The metal forming the upper and lower walls of the rotor may be formed of an alloy similar to that employed to form the side wall 80b as disclosed in the Warkoczewski patent, supra.

As there is a gap required between the top of the rotor 80 and the inner ring 74, a ring 86 is fixed to the inside surface of wall 67 immediately above the top of the rotor and has its inner surface as closely adjacent the outer surface of the spinning torque tube as possible. Ring 86 prevents the migration of burning combustion gases upwardly along the outer surface of the torque tube 28.

In the operation of the inventive apparatus and method, assuming the apparatus assembled as in FIG. 2 with a rotor fixedly threaded on torque tube 28, a conventional source (not shown) of a single feed stream of glass being positioned above the torque tube 28 and water tube 45, such as a platinum bushing with a single orifice therein, the orifice centrally positioned above the tubes mentioned, a conventional source of gas connected to inlet flow line 50, and heat exchanging medium flowing through water tube 45 and spaces 66, 68 and 72, "warming-up" preparation for operation of the device and practice of the method may begin. Rotation of torque tube 28 with attached rotor 80 by belt 34 driven by motor 37 is commenced.

A regulated gas-air mixture of proper combustion ratio to give the temperature desired is flowed in through line 50 to manifold 51 from whence the mixture passes through flow lines 53a, 53b, 53c and 53d to tangential inlet ports 54a, 54b, 54c and 54d. The combustion gases swirl around the combustion chamber 55 at a high velocity with a ring-shaped blast of gas passing downwardly through the continuous circular orifice 78 peripheral of the rotor. This blast, once established, is ignited, whereby to provide a continuous circular ring of burning gases surrounding the periphery of the rotor with the gases moving both downwardly out of combustion chamber 55 and in a circular direction following their path in the combustion chamber. The direction of rotation of the gases must be in the same direction as the direction of rotation of rotor 80, if relatively long fibers are desired. Rings 74 and 75 forming the orifice 78 are removable to permit relocation of the orifice position as desired relative the periphery of the rotor. Thus the position of the flaming ring of burning gas may also be adjusted to the desired position relative the periphery of the rotor. It is preferred that the flames do not actually contact the side wall 80b of the rotor, but pass very closely adjacent thereto whereby to maintain the side wall 80b at a greater temperature than the temperature of the rotor interiorly thereof.

The quantity of gas flowed into the tangential inlet ports 54a–54d, inclusive, is preferably sufficient to move the gases in a circular direction in the chamber 55 and flowing therefrom at a velocity substantially that of rotation of the rotor 80.

When the rotor has reached the desired temperature, a process which may take a substantial period, as from 15 minutes to an hour, a gravity flow of molten glass in a continuous stream downwardly centrally of the water tube 45 is commenced from the source of glass which may be a conventional refractory furnace connected to a one-orifice platinum bushing. The stream of glass falls continuously from the bushing centrally of the tubes 45 and 28 without contacting the walls thereof. As the water tube 45 extends down substantially to the top of member 31, the inner surface of torque tube 28 and the bearings are substantially fully protected from the radiant heat of the glass stream. The glass stream falls into the depression 84 of the rotor 80, forming a pool from which glass is moved peripherally of the rotor by centrifugal force. The quantity of glass flowed into the rotor 80 must be regulated to the amount passed out of the orifices 81 in side wall 80b. Depression 84 compensates for any wavering or inconsistencies in the stream of glass whereby to provide an even feed of glass to the side wall and prevent rotor unbalance, whether or not the stream of glass falls precisely centrally of the bottom wall 80c of the rotor. As the outwardly flowing glass from depression 84 moves up the side wall 80b, it is forced outwardly by centrifugal force through the openings 81 in a plurality of small diameter molten streams. As the streams issue from the outer face of the side wall 80b, they trail the rotor in a direction opposite the direction of rotation thereof. The motion of the gas blast through the orifice 78 (which strikes and attenuates the streams) in the direction of rotation of the rotor tends to compensate for the fiber trailing, permits formation of longer fibers, minimizes fiber winding, and thus improves the product. The uniform, homogeneous character of the gas blast through the continuous circular orifice acts substantially uniformly on all of the streams and thus also provides a more uniform product.

The continuous orifice 78 permits both the movement of the gas blast in the direction of rotation of the rotor and a uniform effect of the blast on the fibers impossible without a homogeneous blast. Flange 73 serves both to guard against any particles which might fly tangentially from the rotor and also serves to aid in directing the fibers in a downward direction as they separate from the continuous streams issuing from the orifices 81. Ring 86 prevents the passage of burning gases thereabove and thus protects the outer surface of the torque tube 28 and the bearings above ring 86.

If openings 79 are provided in an outer ring 75a as shown in FIG. 5, an oxidizing blast may be insured, which, in many cases, may be desirable or necessary to obtain the quality and type of fiber desired. A typical rate of rotation of the rotor 80 in the inventive process would be 4000 r.p.m. By the provision of the flame shield ring 86, it is possible to bring the gas blast in closer to the periphery of the rotor without obtaining excessive heating of the top portion of the rotor. Additionally, the rotor should be as closely spaced to the ring 74 as possible to minimize passage of combustion gases thereabove. Preferably, the side wall 80b of the rotor is maintained at a temperature higher than the input temperature of the glass which may be, for example, 1800° to 1900° F. If the side wall 80b is maintained at approximately 2200° with the temperature of the gas blast next thereto at a yet greater temperature, cooling of the glass before blasting thereof after extrusion from the side wall 80b is avoided. This relationship is preferred.

From the foregoing it will be seen that this invention is one well adapted to attain all of the ends and objects hereinabove set forth together with other advantages which are inherent to the methods and apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matters hereinabove set forth or shown in the accompanying drawings is to be interpreted as illustrative and not in a limiting sense.

Having thus described our invention, we claim:

1. In a process of making fine glass fibers wherein a feed stream of molten glass is poured into a spinning rotor to be distributed by centrifugal force from a plurality of orifices in the periphery of the rotor in a plurality of streams into the path of a gas blast to attenuate the streams and form fine glass fibers therefrom, the improvement which comprises providing a continuous uninterrupted gas blast peripherally spaced from the spinning rotor, said gas blast directed generally vertically and out of contact with said rotor, said blast having only two appreciable components of motion, one circular in the direction of rotation of the rotor, the other in a direction substantially normal to the direction of flow of the glass streams from the periphery of the rotor.

2. In a process of making fine glass fibers wherein a feed stream of molten glass is poured into a spinning rotor to be distributed by centrifugal force from a plurality of orifices in the periphery of the rotor in a plurality of streams and a combustible gas is continuously burned in a combustion chamber above said rotor and the combustion products continuously discharged peripherally of said rotor in such manner as to attenuate the streams and form fine glass fibers, the improvement which comprises burning combustible gas in a circular combustion chamber in such manner as to form a rotating body of combustion gases in said chamber and flowing said gases downwardly from said chamber in a rotating continuous homogeneous sheet of generally cylindrical configuration peripherally spaced from and downwardly past said rotor.

3. A process as in claim 2 wherein the gas in the chamber and the homogeneous gas sheet rotate in the direction of rotation of the rotor.

4. A process of forming fine glass fibers comprising the steps of flowing a feed stream of molten glass into a spinning rotor which distributes said glass by centrifugal force peripherally thereof in a plurality of fine glass streams through orifices therein, forming a rotating circular body of hot gases above said spinning rotor in a combustion chamber and passing said rotating hot gases downwardly out of said combustion chamber in a continuous homogeneous sheet of generally cylindrical configuration in spaced relationship to the periphery of said rotor into contact with said glass streams.

5. A process of forming fine glass fibers comprising the steps of rotating a substantially enclosed body having a plurality of orifices in the periphery thereof, flowing a feed stream of molten glass into said body to be distributed therefrom through said orifices in a plurality of fine streams, flowing burning gases above said body in a circular path and discharging the gases downwardly in a continuous circularly rotating homogeneous sheet of generally cylindrical configuration in spaced relationship to the periphery of said body into contact with said streams.

6. Apparatus for forming fine glass fibers comprising a hollow tube having a longitudinal axis, a rotor having an opening therein detachably fixed to said hollow tube so said opening forms a continuation of said hollow tube, said rotor having a plurality of orifices in the peripheral wall thereof, means for rotating said hollow tube and attached rotor around said axis, a hollow circular combustion chamber positioned above said rotor and circumferential to said hollow tube whereby to provide an unobstructed flow path for combustion gases therethrough, a continuous annular orifice having walls substantially parallel to said tube axis in the underside of said chamber peripheral to said rotor and a plurality of input gas flowlines opening into said chamber and directed so as to pass combustion gases in a swirling circular path within said unobstructed chamber, whereby said swirling action is also characteristic of the gases issuing from said orifice.

7. Apparatus for forming fine glass fibers comprising a hollow tube having a longitudinal axis, a rotor having an opening centrally thereof detachably fixed to said hollow tube with said opening in line with said tube and having a plurality of orifices in the peripheral wall thereof, means for rotating said hollow tube and attached rotor around said axis, a hollow, unobstructed combustion chamber positioned above said rotor and extending circumferentially to said hollow tube whereby to be of circular form and provide an unobstructed flow path for gases therein, a continuous annular orifice having walls substantially parallel to said tube axis in the underside of said chamber peripheral to said rotor, and a plurality of gas inlet ports positioned for passing combustion gases into said chamber in a direction substantially tangential to the inner wall of said chamber whereby to produce a circular swirling blast of combustion gases in said chamber and issuing from said orifice.

8. Apparatus for forming fine glass fibers comprising a rigid frame, a hollow tube having a longitudinal axis rotatably mounted on said frame, a rotor having an opening centrally thereof detachably fixed to said hollow tube with said opening in line with said tube and having a plurality of orifices in the peripheral wall thereof, means mounted in said frame for rotating said hollow tube around said axis, a hollow and unobstructed combustion chamber mounted on said frame and positioned above said rotor, said chamber having an inner wall thereof circumferential to said hollow tube, a continuous annular orifice having walls substantially parallel to said tube axis in the underside of said chamber peripheral to said rotor, a circular manifold mounted on said frame circumferential to said hollow tube and above said chamber, a flow line for passing combustion gases into said manifold, a plurality of flowlines leading from said manifold to said chamber and a plurality of burners connected to said lines and tangentially directed into said combustion chamber so as to cause an uninterrupted and swirling flow of gases to pass in a circular path around said hollow tube within said combustion chamber and issue from said orifice in an uninterrupted swirling flow.

References Cited by the Examiner
UNITED STATES PATENTS 2,949,631    8/1960    Kleist et al. _____ 65—14
3,017,664    1/1962    Ladisch _____ 65—14 X

FOREIGN PATENTS 790,727    2/1958    Great Britain.

DONALL H. SYLVESTER, *Primary Examiner.*